(12) United States Patent
Kao et al.

(10) Patent No.: US 7,747,909 B2
(45) Date of Patent: Jun. 29, 2010

(54) DEBUG CARD

(75) Inventors: Chien-Chih Kao, Taipei Hsien (TW); Sheng-Po Chung, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 532 days.

(21) Appl. No.: 11/565,654

(22) Filed: Dec. 1, 2006

(65) Prior Publication Data

US 2008/0133961 A1 Jun. 5, 2008

(51) Int. Cl.
*G06F 11/00* (2006.01)
(52) U.S. Cl. .......................................... 714/57; 714/36
(58) Field of Classification Search .................... 714/36, 714/57, 56
See application file for complete search history.

(56) References Cited

U.S. PATENT DOCUMENTS

| 5,758,124 | A  | * | 5/1998  | Ogata et al. | 703/27 |
| 6,170,021 | B1 | * | 1/2001  | Graf | 710/15 |
| 6,751,754 | B2 | * | 6/2004  | Tsai et al. | 714/43 |
| 6,873,333 | B1 | * | 3/2005  | Patel et al. | 345/530 |
| 6,882,967 | B2 | * | 4/2005  | Levine et al. | 703/25 |
| 6,915,458 | B2 |   | 7/2005  | Tsai et al. | |
| 7,100,088 | B2 | * | 8/2006  | Kuo | 714/36 |
| 7,162,624 | B2 | * | 1/2007  | Zeng et al. | 713/1 |
| 7,219,221 | B2 | * | 5/2007  | Chao | 713/2 |
| 7,222,230 | B2 | * | 5/2007  | Hsu | 713/2 |
| 2002/0121913 | A1 | * | 9/2002 | Miller et al. | 324/760 |
| 2004/0010773 | A1 | * | 1/2004 | Chan et al. | 717/104 |
| 2004/0024840 | A1 | * | 2/2004 | Levine et al. | 709/217 |
| 2005/0005197 | A1 | * | 1/2005 | Chong et al. | 714/36 |
| 2005/0262398 | A1 | * | 11/2005 | Pan | 714/36 |
| 2006/0020936 | A1 | * | 1/2006 | Wyatt | 717/162 |
| 2006/0026462 | A1 | * | 2/2006 | Zhang et al. | 714/36 |

* cited by examiner

*Primary Examiner*—Robert Beausoliel
*Assistant Examiner*—Elmira Mehrmanesh
(74) *Attorney, Agent, or Firm*—Wei Te Chung

(57) ABSTRACT

A debug card includes a controlling chipset and a VGA connector. The controlling chipset includes a data storage module, a data transforming module, and a VGA controller. The data storage module stores data received from a computer system, which represents the status of the computer system. The data transforming module transforms the data and transmits the transformed data to the VGA controller. The VGA connector interconnects the VGA controller and a VGA display to display the data.

4 Claims, 5 Drawing Sheets

DEBUG CARD

BACKGROUND OF THE INVENTION

1. Field of The Invention

The present invention relates to debug cards, and more particularly to a debug card for debugging a computer system.

2. Description of Related Art

During a design phase, newly designed computer systems are not stable and reliable for mass-production, and include many firmware and software bugs. The newly designed computer systems require testing and debugging to improve their performance. A debug card is a very useful tool in the process of testing and debugging.

A typical debug card includes a microcontroller, a storage device connected to the microcontroller, and means for connecting the debug card to a bus of a computer system. The debug card receives information via the bus, and records the information in the storage device. The debug card also includes a plurality of seven-segment light emitting diodes (LEDs) to represent the captured information. However, the seven-segment LEDs often are limited in how much information they can convey, which may cause an operator performing the testing to be unclear regarding the debug information.

It is therefore desirable to find a new debug card to indicate the debug information clearly.

SUMMARY OF THE INVENTION

A debug card includes a controlling chipset and a VGA connector. The controlling chipset includes a data storage module, a data transforming module, and a VGA controller. The data storage module stores data received from the computer system, which represents the status of the computer system. The data transforming module transforms the data and transmits the transformed data to the VGA controller. The VGA connector interconnects the VGA controller and a VGA display to display the data.

Other advantages and novel features will be drawn from the following detailed description of preferred embodiments with attached drawings, in which:

DETAILED DESCRIPTION OF THE INVENTION

Figure 1:
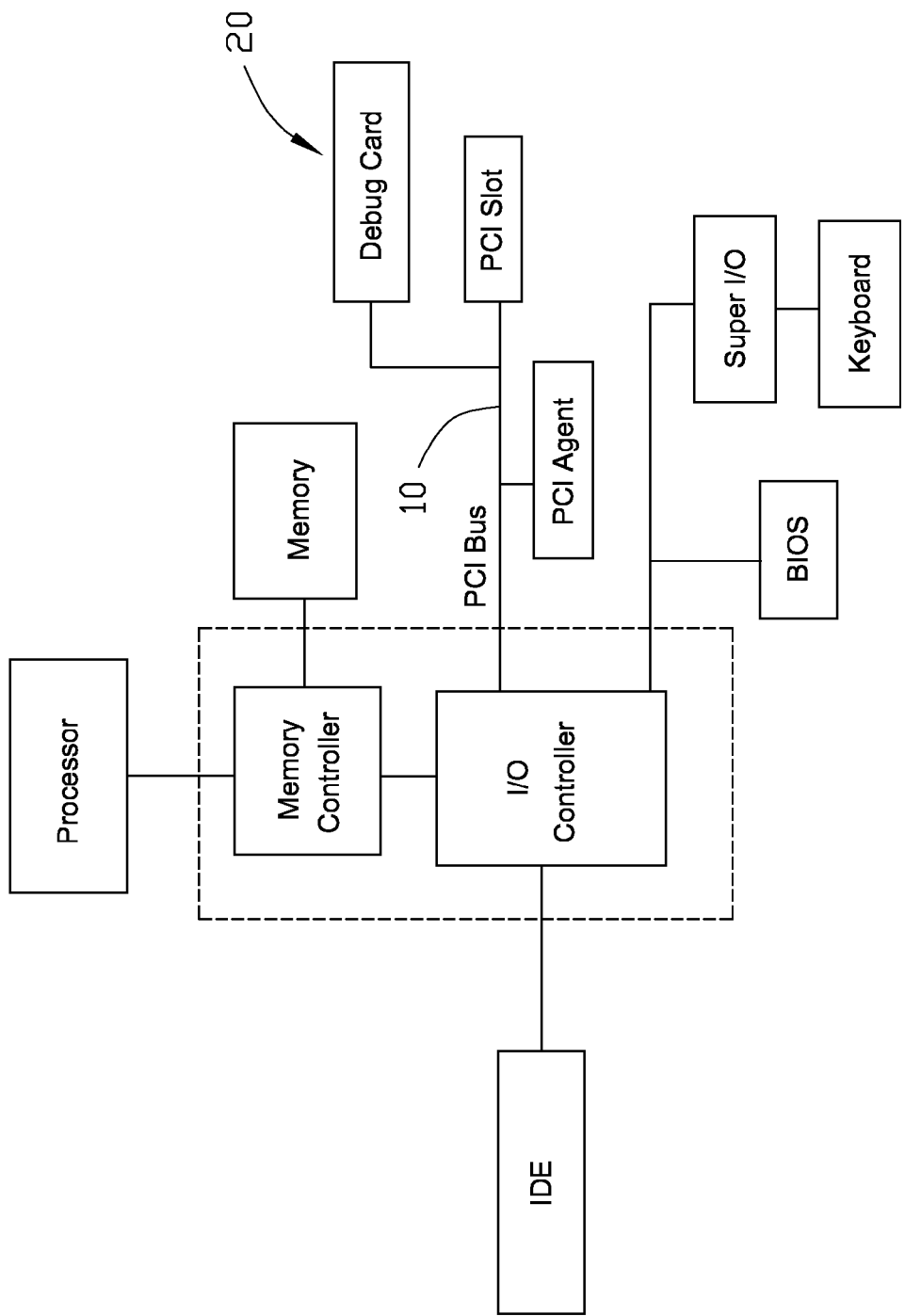
FIG. 1 is a block diagram of a debug card in accordance with a preferred embodiment of the present invention connected to a computer system.

Referring to FIG. 1, a debug card 20 is connected to a PCI (peripheral component interface) bus 10 of a computer system.

Figure 2:
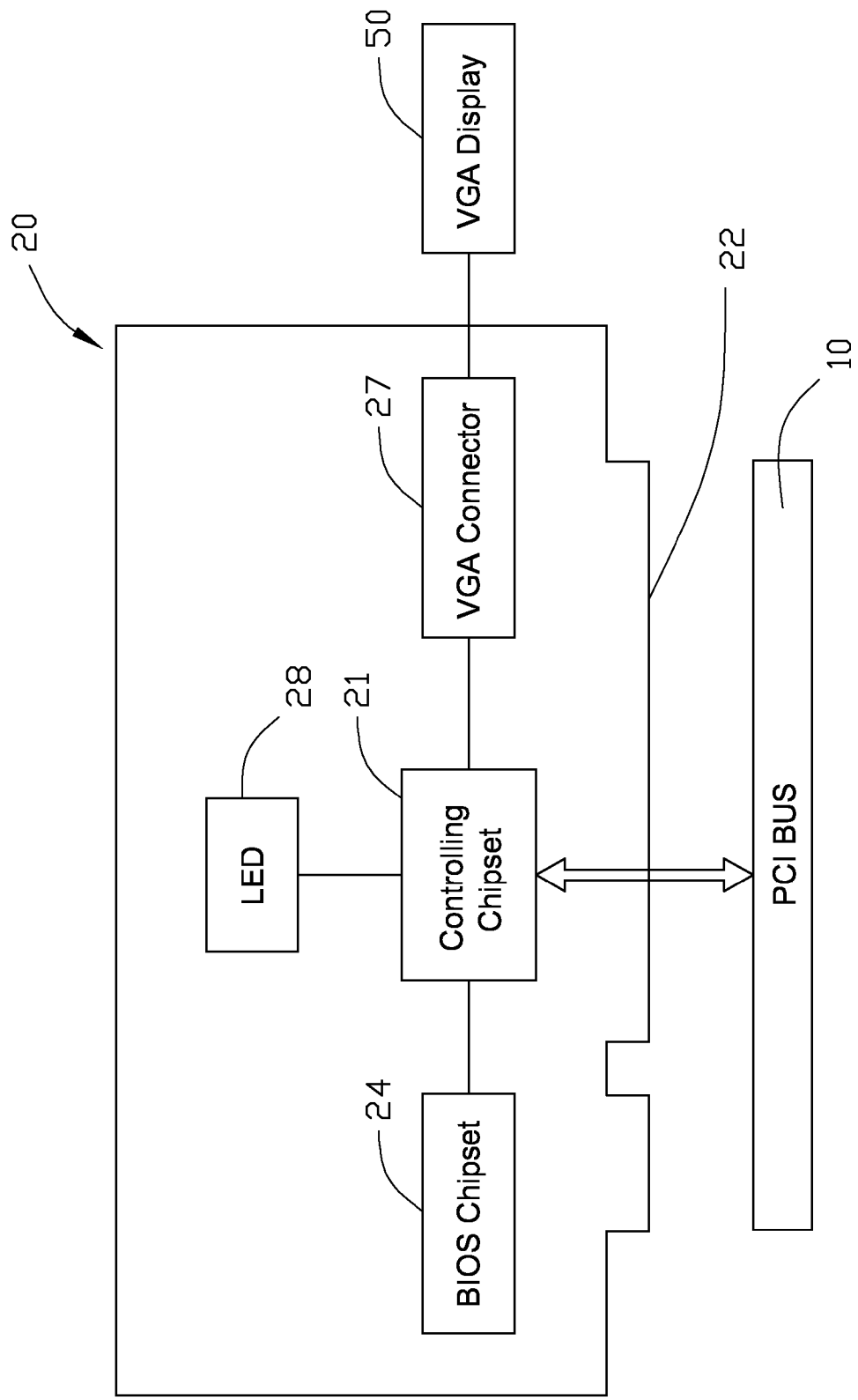
FIG. 2 is a block diagram of the debug card of FIG. 1.

Referring to FIG. 2, the debug card 20 includes a controlling chipset 21, a BIOS (Basic Input Output System) chipset 24, a VGA (Video Graphic Array) connector 27, a plurality of seven-segment LEDs 28, and an edge connector 22 adapted for connecting to the PCI bus 10. The VGA connector 27 is connected to a VGA display 50.

Figure 3:
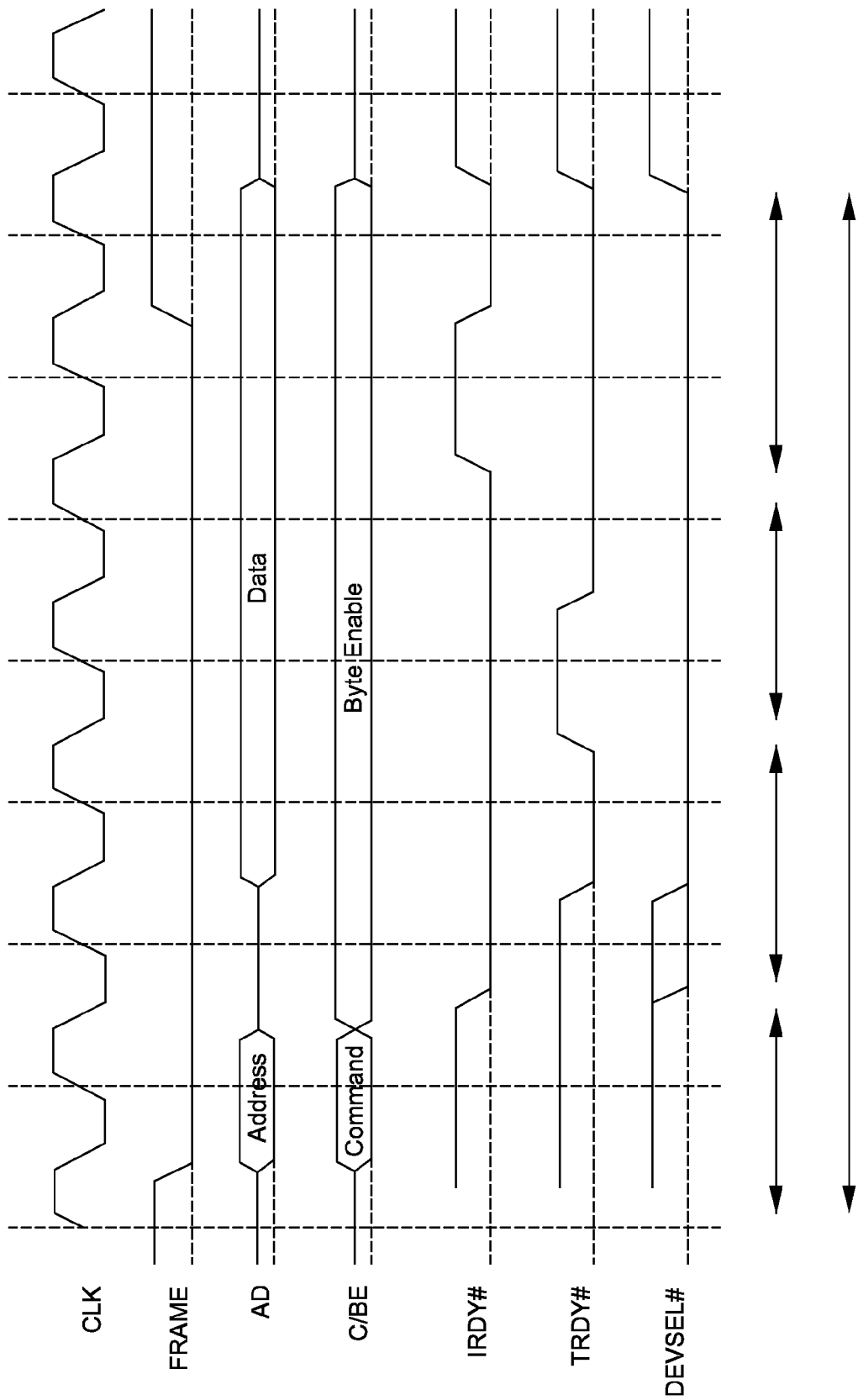
FIG. 3 is a time-ordered diagram that depicts the relation between the transmission frequencies of different buses and the sampling time orders generated according to the PCI bus transmission frequencies.

FIG. 3 shows the time ordered diagram of the PCI bus 10. When the FRAME# signal changes from high to low, it signals the beginning of a PCI bus cycle. At this moment, the data on the AD (address/data) bus is the address that the PCI bus cycle wants to position while the data on the C/BE# (command/byte enable) is the command. Each device on the PCI bus cycle will perform decoding on the address and command to determine if it is a target device of the PCI bus cycle. If so, the device selection signal DEVSEL# is set to keep at LOW as a response. When the target device is finished reading/writing, it sends out a TRDY# ready signal to notify the PCI host for performing subsequent data transmission.

Figure 4:
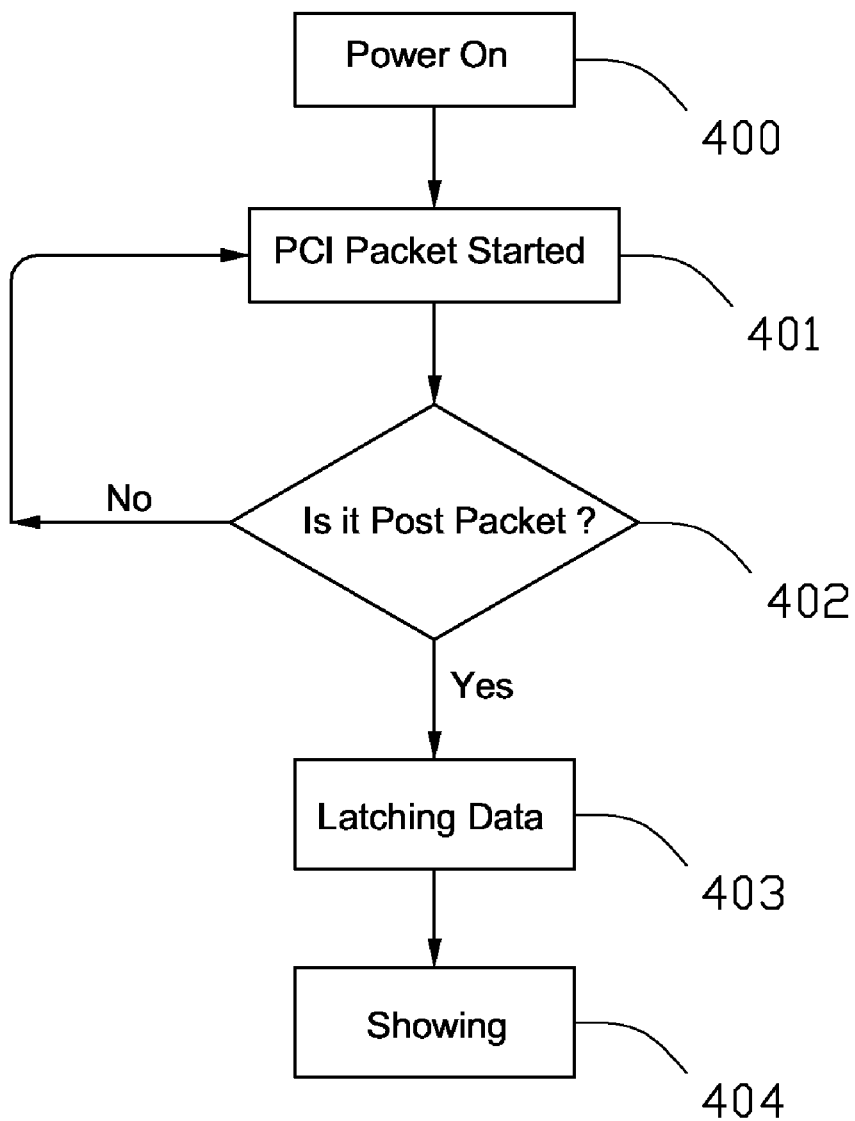
FIG. 4 is a flow chart of the debug card debugging the computer system of FIG. 1.

When the computer system is on, a BIOS chipset in the computer system runs a power-on self-test (POST). The computer system outputs codes, which represent the status of the computer system, to port 80 or some other port during POST. The debug card 20 captures the codes during POST. FIG. 4 shows the steps of the debug card 20 capturing the codes as described below:

In step 400, the computer system is powered on;

In step 401, the controlling chipset 21 of the debug card 20 checks the FRAME# signal.

When the FRAME# signal is low, it shows a PCI packet is initiated;

In step 402, the controlling chipset 21 checks if the PCI packet is a POST packet. If the data on C/BE# is 0011B which indicates an I/O write operation, and the data on AD is 80H which indicates the target is port 80, the PCI packet is a POST packet. If the PCI packet is a POST packet, go to step 403. If not, go back to step 401;

In step 403, the data on AD, which is the POST code corresponding to the tested device, is captured by the debug card 20;

In step 404, the captured POST code is shown on the VGA display 50 via the VGA connector.

Figure 5:
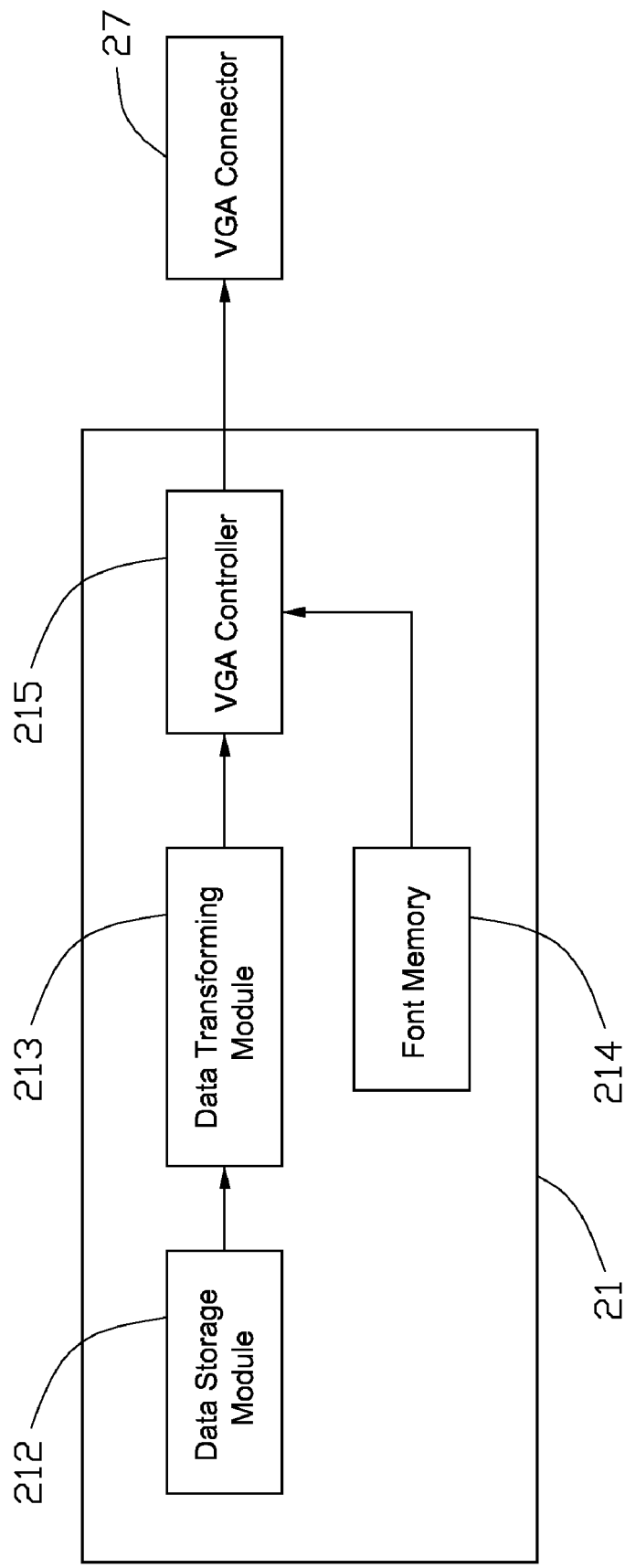
FIG. 5 is a block diagram of a controlling chipset of the debug card of FIG. 1.

Referring to FIG. 5, the controlling chipset 21 includes a data storage module 212, a data transforming module 213, a VGA controller 215, and a font memory 214 connected to the VGA controller 215. The latched data in step 403 is stored in the data storage module 212. The data transforming module 213 transforms the data and transmits it to the VGA controller 215. The VGA controller 215 processes the data with the assistance of the font memory 214, and outputs the processed data to the VGA connector 27, which connects to the VGA display 50. Because the VGA display 50 can represent more information than the seven-segment LEDs, a user performing the tests using the present invention, can get a clear understanding of the debug information from the VGA display 50.

In the present embodiment of the invention, the debug card 20 retains the seven-segment LEDs 28 for back-up.

Further, the BIOS chipset 24 of the debug card 20 is able to serve as a back-up BIOS chipset if a BIOS chipset of the computer system breaks down. For example, when the computer system is powered on, the processor sends a memory read command. The BIOS chipset of the computer system will get this command and send corresponding data back. If the BIOS chipset of the computer system crashes or has bugs, the processor can't get the corresponding data to go on with a booting up process. In this case, the debug card 20 is inserted into a PCI slot of the motherboard, and the BIOS chipset 24 works. The memory read command is gotten and responded to by the BIOS chipset 24 instead of the BIOS chipset of the computer system, and the computer system boots up normally.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A debug card, comprising:

a controlling chipset, the controlling chipset and a tested device of a computer system connected to a same bus of the computer system; the controlling chipset capable of capturing data from the bus after the tested device responds to a cycle beginning signal of the bus, the data representing the status of the tested device; the controlling chipset comprising a data storage module configured for storing the data which is received from the computer system and represents the status of the tested device of the computer system, a VGA controller, and a data transforming module configured for transforming the data and transmitting the transformed data to the VGA controller; and a VGA connector interconnecting the VGA controller and a VGA display to allow the data being shown in the VGA display;

wherein a BIOS chipset is attached on the debug card in a manner such that when a BIOS chipset of the computer system is broken down, the BIOS chipset of the debug card serves as a backup BIOS chipset to boot up the computer system.

2. The debug card as described in claim 1, wherein the controlling chipset comprises a font memory connected to the VGA controller to provide font to the VGA controller.

3. The debug card as described in claim 1, further comprising a plurality of seven-segment LEDs.

4. The debug card as described in claim 1, further comprising an edge connector configured to connect with a PCI bus of the computer system, the debug card receiving the data of the computer system via the edge connector.

* * * * *